T. M. HENDRICKSON.
LIFTING JACK.
APPLICATION FILED MAY 6, 1915.
1,153,223.
Patented Sept. 14, 1915.
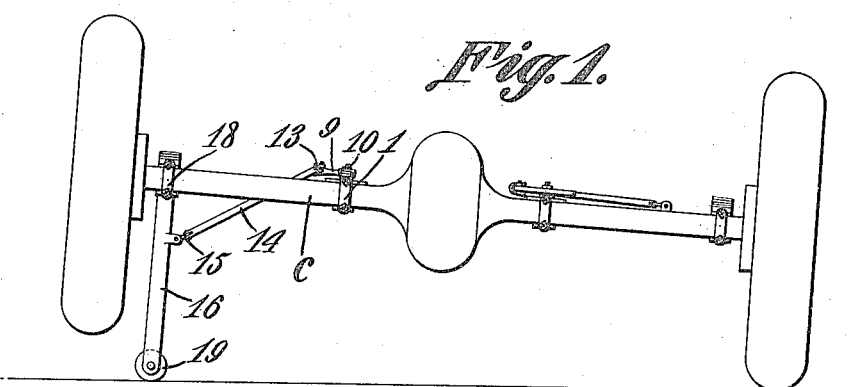
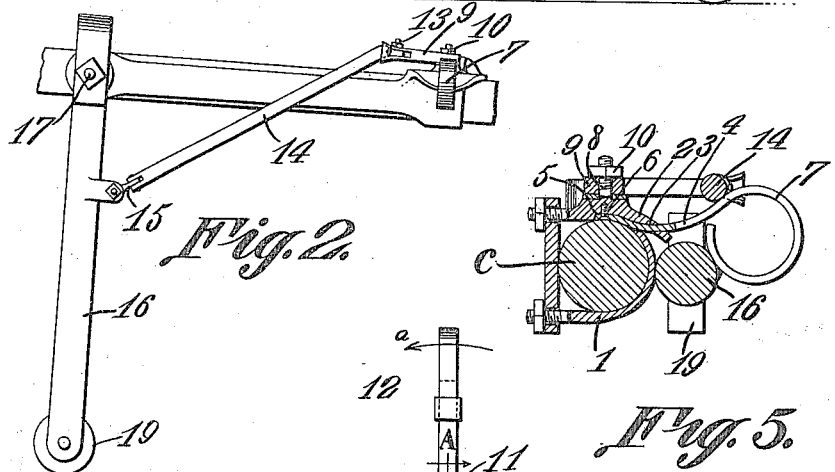
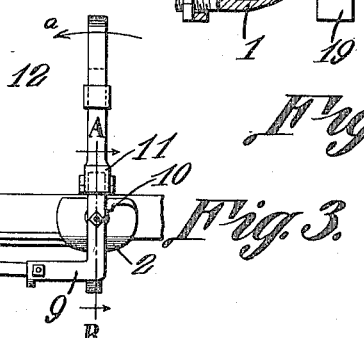
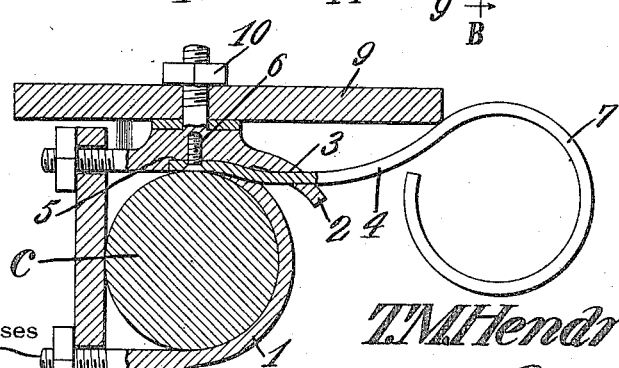
T. M. Hendrickson, Inventor
Witnesses
Attorneys
COLUMBIA PLANOGRAPH CO., WASHINGTON, D. C.

UNITED STATES PATENT OFFICE.

THOMAS M. HENDRICKSON, OF LEES SUMMIT, MISSOURI, ASSIGNOR OF ONE-HALF TO THOMAS J. RAGSDALE, OF LEES SUMMIT, MISSOURI.

LIFTING-JACK.

1,153,223.

Specification of Letters Patent. Patented Sept. 14, 1915.

Application filed May 6, 1915. Serial No. 26,336.

*To all whom it may concern:*

Be it known that I, THOMAS M. HENDRICKSON, a citizen of the United States, residing at Lees Summit, in the county of Jackson and State of Missouri, have invented a new and useful Lifting-Jack, of which the following is a specification.

This invention relates to lifting jacks designed as an attachment for the axle of an automobile, one of the objects of the invention being to provide a jack which can be applied readily to the axle and which is normally positioned where it is inconspicuous.

A further object is to provide simple means whereby the jack can be quickly shifted to active position, thereby to hold one of the wheels of the vehicle off of the ground.

Another object is to provide a jack which is simple in construction, cheap to manufacture, and which will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of an automobile axle having applied thereto two jacks constituting the present invention, one of the jacks being shown in active position and the other jack in inactive position. Fig. 2 is an enlarged rear elevation of one of the jacks in active position. Fig. 3 is a plan view of the structure shown in Fig. 2. Fig. 4 is an enlarged section on line A—B Fig. 3. Fig. 5 is a similar view on a reduced scale, showing the relative positions of the parts when the jack is lifted out of active position.

Referring to the figures by characters of reference C designates an axle of a vehicle and this axle is adapted to be supplied with two jacks such as constitute the present invention. Each jack includes a clip 1 adapted to be secured about the axle and having a tongue 2 extending from the upper portion thereof, this tongue being provided with a slot 3. One end of a spring strip 4 is adapted to be inserted through the slot 3 and into a recess 5 in the upper portion of the clip where the spring strip is secured by means of a screw 6 or the like. This spring strip extends outwardly beyond tongue 2 and terminates in a spring loop 7.

Projecting upwardly from the clip 1 is a threaded stud 8 on which is pivotally mounted a bell crank lever 9 adapted to be held on the stud by means of a nut 10 or the like. One end of this bell crank lever is adapted to be adjustably engaged by the socketed end 11 of an actuating handle 12 which can be of any construction desired. The other arm of the bell crank lever is connected by a universal joint 13 to a rod 14 which, in turn, is connected by a universal joint 15 to the main bar 16 of the jack. This bar is pivotally mounted, adjacent its upper end, upon a stud 17 extending laterally from a clip 18 which is secured to axle C and the lower end of the bar is provided with a roller 19.

By referring particularly to Fig. 3, it will be seen that the bell crank lever 9 is not pivotally mounted at the angle portion thereof, but is pivotally mounted at a point between the ends of one of the arms of the lever. Thus when the bell crank lever is shifted in the direction indicated by the arrow *a* in Fig. 3, bell crank lever 9 will pull through rod 14 upon the bar 16 and cause said bar to swing upwardly toward the axle, the bar being received between the clip 1 and the spring loop 7, as shown in Fig. 5, while at the same time the rod 14 rides over the loop 7 and becomes yieldingly supported thereby, with the result that bar 16 is thus held yieldingly in its raised or inactive position.

When it is desired to use the jack, the bell crank lever 9 is swung in a direction opposite to that indicated by arrow *a* in Fig. 3 and, consequently, the rod 14 will be forced off of the spring loop 7 and will thrust against bar 16 and cause said bar to swing downwardly until the roller 19 comes into contact with the ground. By continuing to press against bar 16, one end of the axle C will be raised and the jack will thus assume the position as shown in Fig. 1, wherein the center of gravity is along a line extending inside of the roller 19. Consequently the jack will remain in the position to which it is adjusted and the axle C will thus be properly supported.

By providing two jacks on each axle, either end of the axle can be readily raised when desired. Both jacks are of like construction with the exception that one is a right hand jack and the other a left hand jack.

What is claimed is:—

1. A jack for attachment to the axle of a vehicle, including an angular handle engaging lever, means for engaging an axle to pivotally support the lever, a bar, means pivotally engaged by the bar for attachment to the axle, a rod connecting said bar to one arm of the lever, and yielding means for engaging the rod to support said rod and the bar in elevated or in active position.

2. A jack for attachment to a vehicle axle, including an axle engaging element, a bar pivotally connected thereto, a second axle engaging element, a lever pivotally mounted thereon, a rod, universal connections between said rod and the bar, an outstanding yieldable member, said rod being movable on said member to support the bar between the member and the axle.

3. The combination with a vehicle axle, of a jack secured to each end portion thereof, each jack including separate axle engaging members, a roller carrying bar pivotally connected to one of the members, a lever connected to the other member, a yieldable element outstanding from said last mentioned member, a rod connecting the lever to the bar, and means for actuating the lever to position the rod upon the yieldable element and to elevate the bar between said member and the axle.

In testimony that I claim the foregoing as my own, I have hereto affixed my signature in the presence of two witnesses.

THOMAS M. HENDRICKSON.

Witnesses:
JOHN M. HACKLER,
THOMAS J. RAGSDALE.

Copies of this patent may be obtained for five cents each, by addressing the "Commissioner of Patents Washington, D. C."